United States Patent
Ebert et al.

(10) Patent No.: US 9,861,110 B2
(45) Date of Patent: Jan. 9, 2018

(54) CASING BRAKE ASSEMBLY

(71) Applicant: Poly-clip System GmbH & Co. KG, Hattersheim (DE)

(72) Inventors: Detlef Ebert, Bad Nauheim (DE); Wolfgang Nikoley, Mainz-Kastel (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 15/387,049

(22) Filed: Dec. 21, 2016

(65) Prior Publication Data

US 2017/0172163 A1 Jun. 22, 2017

(30) Foreign Application Priority Data

Dec. 22, 2015 (EP) .................................. 15202172

(51) Int. Cl.
*A22C 11/00* (2006.01)
*A22C 11/02* (2006.01)
(Continued)

(52) U.S. Cl.
CPC ........ *A22C 11/0263* (2013.01); *A22C 11/008* (2013.01); *A22C 11/02* (2013.01);
(Continued)

(58) Field of Classification Search
CPC ....... A22C 11/00; A22C 11/001; A22C 11/02; A22C 11/0209; A22C 11/0227; A22C 11/0263
(Continued)

(56) References Cited

U.S. PATENT DOCUMENTS

| | | | | |
|---|---|---|---|---|
| 5,197,914 A | * | 3/1993 | Powers | A22C 11/0263 452/32 |
| 7,575,506 B2 | * | 8/2009 | Ebert | A22C 11/10 452/35 |
| 2013/0122792 A1 | * | 5/2013 | Ebert | A22C 11/125 452/48 |

FOREIGN PATENT DOCUMENTS

| | | |
|---|---|---|
| CH | 704261 A1 | 6/2012 |
| EP | 0275487 A1 | 7/1988 |

(Continued)

OTHER PUBLICATIONS

Extended European search report issued in corresponding European Application No. 15202172.1 dated Jun. 17, 2016 (9 pages).

*Primary Examiner* — Richard Price, Jr.
(74) *Attorney, Agent, or Firm* — Fitch Even Tabin & Flannery LLP (57) ABSTRACT

A casing brake assembly is provided for applying a frictional force to a tubular or bag-shaped packaging casing being arranged on a filling tube of a production apparatus, like a clipping machine, which is used in the production of sausage-shaped products, like sausages, and for limiting the movement of said tubular or bag-shaped packaging casing at least while being filled. The casing brake assembly comprises a tubular support device for supporting at least one brake element having an at least approximately ring-shaped design. The casing brake assembly further comprises a tubular bushing for accommodating the tubular support device and the at least one brake element, and an attachment device including an at least approximately tubular accommodation portion for accommodating the tubular bushing, and at least one attachment portion configured for attaching the casing brake assembly to the production apparatus. Furthermore, an apparatus for producing sausage-shaped products, like sausages, includes a mounting device for (Continued)

reversibly mounting a casing brake assembly thereto and a casing brake assembly for applying a frictional force to the tubular or bag-shaped packaging casing while being filled.

14 Claims, 7 Drawing Sheets

(51) Int. Cl.
*A22C 11/10* (2006.01)
*A22C 11/12* (2006.01)

(52) U.S. Cl.
CPC .......... *A22C 11/0245* (2013.01); *A22C 11/10* (2013.01); *A22C 11/125* (2013.01)

(58) Field of Classification Search
USPC ........... 452/21–26, 30–32, 35–37, 46–48, 51
See application file for complete search history.

(56) References Cited

FOREIGN PATENT DOCUMENTS

| | | | |
|---|---|---|---|
| EP | 1428437 | A1 | 6/2004 |
| EP | 1748696 | B1 | 7/2008 |
| EP | 2371223 | A1 | 10/2011 |
| EP | 2767168 | A1 | 8/2014 |

* cited by examiner

Fig. 7

CASING BRAKE ASSEMBLY

CROSS-REFERENCE TO RELATED APPLICATION

The present application claims the benefit of priority of European Patent Application No. 15202172.1 filed Dec. 22, 2015, the contents of which are incorporated herein by reference in their entirety.

FIELD

The present invention relates to a casing brake assembly and an apparatus for producing sausage-shaped products which includes such a casing brake assembly.

BACKGROUND OF THE INVENTION

In practice, it is known that, for example in the production of sausage-shaped products, like sausages, filling material is fed by a filling machine through a filling tube of a clipping machine into a tubular or bag-shaped packaging casing which is temporarily stored on the filling tube and which is closed at its front end, i.e. the end pointing in the feeding direction of the filling material, by a closure means, like a closure clip, or by fusing this end, respectively. The tubular packaging casing is pulled-off from the filling tube while being filled by the feeding pressure. At least during the filling process, a casing brake applies a frictional force to the tubular packaging casing while being pulled-off from the filling tube, in order to control the pull-off speed and to ensure an at least approximately constant filling degree. After a predetermined volume of filling material has been filled into said tubular packaging casing, gathering means with a first and a second displacer unit which can each be formed by a pair of reversibly moveable displacement elements, a plait-like portion of the tubular packaging casing is formed. The plait-like portion is at least approximately free of filling material. The clipping machine then places and closes at least one closure clip at the plait-like portion forming the rear end of the sausage or bag-shaped product, i.e. the end pointing opposite to the feeding direction by respective closing tools which are reversibly movable towards the plait-like portion.

From EP patent application 1 428 437, a clipping machine is known including a casing brake assembly. This known casing brake assembly is attached to a frame element of the clipping machine. The casing brake itself has a closed circular design and in particular a closed circular lip which completely surrounds the filling tube. A fork-shaped holding element including two rakes, accommodates and supports the casing brake in its operating position. For adjusting the force applied to the tubular casing, and for removing the casing brake from the clipping machine, the fork-shaped holding element with the casing brake halt therein, must be shifted along the filling tube in the filling direction. Thereafter, the casing brake may be removed out of the fork-shaped holder in a direction vertically to the longitudinal axis of the filling tube. A sensor arrangement may detect the presence or absence of the casing brake.

Moreover, EP patent application 1 748 696 discloses a clipping machine for sausages, which includes a fork-shaped holder for a casing brake. The holder has a semicircular portion formed by two arms. The casing brake of a generally circular shape has a circumferentially extending groove into which the arms of the fork-shaped holder engage for securing the casing brake in axial direction on the clipping machine. An inductive sensor is provided, which may detect a metallic component of the casing brake when in its operating position.

Even if sensor means which detect the presence or absence of a casing brake may prevent an operation of the clipping machine without a casing brake assembly being in its operating position in order to avoid the possibility that an operator can reach into the gathering means and can thus be hurt seriously, during operation of a clipping machine, there exists still the risk that an operator may grasp into moving parts of said clipping machine, like the gathering means, e.g. by entering a gap between a housing portion of the clipping machine accommodating the gathering means, and the casing brake positioned upstream said gathering means outside the housing.

In some cases where the casing brake has to be shifted along the filling tube, in particular in a direction away from the gathering means, e.g. for adjusting the frictional force applied to the casing material or for adapting the clipping machine to different products, the size of the gap between the gathering means and the casing brake may disadvantageously be increased, thereby increasing the risk of reaching the gathering means with the fingers of an operator.

Thus, it is an object of the present invention to provide a casing brake assembly and a clipping machine using the casing brake assembly which overcome the above mentioned drawbacks and which allows a simplified and compact design of the clipping machine with a high level of security for the operator.

SUMMARY OF THE INVENTION

According to the present invention, there is provided a casing brake assembly for applying a frictional force to a tubular or bag-shaped packaging casing being arranged on a filling tube of a production apparatus, like a clipping machine, which is used in the production of sausage-shaped products, like sausages, and for limiting the movement of said tubular or bag-shaped packaging casing at least while being filled. The casing brake assembly comprises tubular support means for supporting leastwise one brake element having an at least approximately ring-shaped design. The casing brake assembly further comprises a tubular bushing for accommodating the tubular support means together with the brake element, and an attachment device including an at least approximately tubular accommodation portion for accommodating the tubular bushing, and at least one attachment portion configured for attaching the casing brake assembly to the production apparatus.

The attachment device is adapted to be arranged on the production apparatus in a fixed position relative to the production apparatus, or at least a portion of the housing thereof.

The attachment device of the inventive casing brake assembly may thereby be positioned in fixed relationship, and in particular in a defined distance to the production apparatus or clipping machine, and particularly to a portion of a housing of said clipping machine, which accommodates the gathering means. Thereby, at least the gap between said portion of the housing of said clipping machine and the casing brake may also be kept constant.

It has to be understood that the casing brake assembly may include more than one brake element preferably of identical, approximately ring-shaped design.

In one embodiment of the casing brake assembly according to the present invention, a first adjustment means may be provided at the at least approximately tubular support means and the at least approximately tubular bushing, for adjusting at least the axial position of the support means relative to the tubular bushing.

By means of said first adjustment means, the support means may be shifted in axial direction relative to the tubular bushing, whereby, for varying the frictional force applied to the tubular packaging casing, the at least one ring-shaped brake element may be deformed in a defined manner.

However, in the case that the frictional force applied to the tubular packaging casing by the brake elements not needs to be varied, the first adjustment means may be of a more simple design, e.g. including ratchet elements or the like, for only supporting the brake rings in the tubular casing.

Alternatively or additionally to the first adjustment means, a second adjustment means may be provided at the at least approximately tubular bushing and the attachment device, for adjusting at least the axial position of the tubular bushing relative to the attachment device.

The second adjustment means allow a relative movement between the tubular bushing and the attachment device, for varying the position of the at least one ring-shaped brake element on the filling tube, e.g. for adapting the clipping machine to different products having different filling materials.

It is one of the essential functions of the first and second adjustment means to enable a reversible shifting of the support means relative to the tubular bushing, and a reversible shifting of the tubular bushing relative to the attachment device, respectively, in axial direction.

The first as well as the second adjustment means may be realized in various ways.

In an advantageous embodiment, the first adjustment means may include a guide element provided on the outer surface of the support means, and a counter-guide element provided on the inner surface of the tubular bushing.

Moreover, also the second adjustment means may include a guide element provided on the outer surface of the tubular bushing, and a counter-guide element provided on the inner surface of the tubular accommodation portion of the attachment device.

The first and second adjustment means may therefore include any suitable guide means for fulfilling their function, like linear guide means including grooves and tongues, or corresponding polygonal cross section shapes of inner and outer surfaces of the respective elements to be shifted.

According to a specific configuration, the first adjustment means may include an external thread provided on the outer surface of the support means, and an internal thread provided on the inner surface of the tubular bushing.

In the case that second adjustment means is provided, also said second adjustment means may include an external thread provided on the outer surface of the tubular bushing, and an internal thread provided on the inner surface of the at least approximately tubular accommodation portion of the attachment device.

Dependent on the kind of thread, like metric screw thread or trapezoid thread, and its pitch, a very exact positional adjustment is possible. Moreover, such kinds of thread may be used, which have self-locking features, for preventing an unintentional change of the selected adjustment.

The at least approximately ring-shaped brake elements or brake rings may be made of an elastic material in order to be deformable, for adjusting a defined frictional force to be applied to the tubular packaging casing.

In the case that more than one brake element is present, these elements preferably of identical material and/or design. However, the more than one brake elements may also be of different design, e.g. for supporting different functions, like shifting on or throwing off of the casing brake assembly to or from the filling tube.

In an alternative embodiment of the inventive casing brake assembly, the brake elements are inflatable and deflatable for additionally adjusting a defined frictional force to be applied to the tubular packaging casing. In order to supply a pressurized fluid, like air, oil or water, to the inflatable and deflatable brake elements, respective fluid connections have to be provided. Accordingly, the at least approximately tubular bushing and the at least approximately tubular accommodation portion of the attachment device may be provided with respective openings overlaying each other, through which a fluid connection to the inflatable and deflatable brake elements may be realized. It has to be understood that respective adjustment means are provided, for adjusting a defined pressure inside the brake elements which corresponds to a selected frictional force to be applied to the tubular packaging casing.

In an advantageous configuration of the inventive casing brake assembly, the attachment device may further comprise a securing device for securing the tubular bushing in its position relative to the attachment device. The securing device allows securing the tubular bushing in different positions relative to the attachment device, and thus, securing the position of the at least one ring-shaped brake element on the filling tube. Thereby, a second adjustment means of easy motion may be selected, which does not need to be provided with any locking features, and by means of which the position of the at least one ring-shaped brake element on the filling tube may rapidly be changed. After the adjustment of the tubular bushing, the at least one ring-shaped brake element may easily be secured in the selected position on the filling tube by the securing device.

Different kinds of securing devices may be used for securing the tubular bushing in its position relative to the attachment device. For example, the securing device may include securing or fixing elements, like screws or bolts, which may be inserted into respective holes being provided in the adjustment device and the tubular bushing.

In a preferred embodiment, the securing device includes an approximately hook-shaped ratchet element provided on the attachment device, which is reversibly movable between a release position and a locking position, and which, in the locking position, engages at least one counter-ratchet element arranged on the outer surface of the tubular bushing.

For preventing the ratchet element from unintentionally disengaging the counter-ratchet elements, the ratchet element may be spring-biased in the locking position. Alternatively, securing pins or the like may be provided for securing the ratchet element in its position when engaging the counter-ratchet element.

In a further preferred embodiment of the inventive casing brake assembly, the at least one attachment portion of the attachment device includes at least one attachment element for attaching the casing brake assembly to the production apparatus for filling and closing said tubular or bag-shaped packaging casing.

In a simple case, the attachment element may be an element extending from the attachment device, like a pin or rod, which may be inserted into a respective opening or hole in the clipping machine.

The attachment portion may also be realized by one or more protrusions extending from the accommodation portion. Said protrusions may be of equal or different constitution, and may be positioned in regular or non-regular intervals on the outer surface of the accommodation portion.

Dependent on the number and kind of protrusions, it is possible to correctly attach the casing brake assembly in one or more positions to the clipping machine. However, by means of said one or more attachment portions, a correct positioning of the casing brake assembly in its operating position on the clipping machine may be secured.

In an advantageous configuration, the attachment element is a specifically shaped element on the outer surface of the attachment portion. One example of an element with a specific shape is a groove which is arranged on the outer surface of the attachment portion. In another embodiment, said element with a specific shape includes a flat surface portion having a specific orientation. It is also possible that the attachment element includes a combination of different features, like an at least partially circumferentially arranged groove with a flat bottom surface of a specific orientation. Moreover, the groove may have different cross sectional shapes, like a rectangular, triangular or trapezoid shape, to enable an attachment of the casing brake assembly in a defined position. The attachment element, when having a specific shape, may also require a predefined orientation of the casing brake assembly for its insertion into a respective mounting unit of the clipping machine.

It is advantageous that the attachment device further includes a position defining device. The position defining device ensures that the casing brake assembly, when inserted into a respective mounting unit of the clipping machine, is arranged in a correct radial position relative to the filling tube, e.g. in cases where clearances have to be provided for attaching or removing the casing brake assembly to or from the clipping machine. Preferably, the position defining device secures the casing brake assembly in a position coaxially with the filling tube.

Moreover, in the case that the position defining device includes locking means, the casing brake assembly may be secured in its correct position by said locking means.

In a simple configuration, the position defining device is realized by an element extending into the specific shape of the attachment element, which engages the respective counter surface of the mounting unit on the clipping machine. Such an element may be a spring-biased sphere extending laterally into a groove which forms the attachment element. The sphere may engage a respective hole or depression in the respective counterpart, e.g. a part of the mounting unit which engages the groove while mounting the casing brake assembly thereto.

Further according to the present invention, there is provided a production apparatus for producing sausage-shaped products, like sausages, by filling tubular or bag-shaped packaging casings with filling material and closing a filled tubular or bag-shaped packaging casing. The apparatus includes a filling tube through which filling material is fed into tubular or bag-shaped packaging casing which is stored on said filling tube, gathering means for gathering said filled tubular packaging casing and for forming a plait-like portion thereto, and a clipping device for applying at least one closure means, like a closure clip, to the plait-like portion formed on the filled tubular or bag-shaped packaging casing.

The apparatus further comprises a mounting device for reversibly mounting a casing brake assembly thereto, and a casing brake assembly according to the present invention.

The production apparatus for producing sausage-shaped products, or the clipping machine, thereby provides all advantages as explained in conjunction with the inventive casing brake assembly.

It is further advantageous that the mounting device includes a mounting element which is adapted to reversely engage the attachment portion of the casing brake assembly, to enable a quick and easy mounting and demounting of the casing brake assembly to or from the clipping machine.

The mounting element is arranged in a fixed position relative to the clipping machine, or at least a housing portion thereof. Thereby, the mounting device of the casing brake assembly when mounted to the clipping machine is also arranged in a fixed position relative to the clipping machine, or at least a housing portion thereof.

In a preferred embodiment of the production apparatus for producing sausage-shaped products, or the clipping machine, a sensor means is provided for detecting the casing brake assembly when positioned in the mounting device. Thereby, in the case that the casing brake assembly is not or at least not correct positioned on the clipping machine, an operation of the clipping machine, and thus, an unintended engagement of an operator into the operating machine, may securely be prevented.

Additionally or alternatively, the sensor means may detect further, specific features of the casing brake assembly attached to the production apparatus with regard to their usability for the selected product to be produced, like features regarding their size or the kind of brake elements. It has to be understood that by sensing said specific features, also an information regarding the presence and/or the correct position of the casing brake assembly may be captured.

As an alternative to the production apparatus for producing sausage-shaped products, which includes the mounting device to which the casing brake assembly according to the present invention may be mounted, the mounting unit may be provided as an upgrade part for being attached to an existing clipping machine. Thereby also in said existing clipping machine, the casing brake assembly according to the present invention may be used, providing all the above discussed advantages.

For being attachable to an existing clipping machine, the mounting unit includes a fixing unit. By means of said fixing unit, the mounting unit for the casing brake assembly may be fixed to the clipping machine, e.g. to a housing portion or a frame element of said clipping machine.

The fixing unit may include any suitable fixing means for form-fit or force-fit fixing the mounting unit to the clipping machine, like clamping or screwing means.

Further advantages and preferred embodiments of the present invention will be described in the following together with the drawings listed below. The expressions "left", "right", "below" and "above" used in the following description, are referred to the drawings in an alignment such that the reference numbers and the notation of the Figs. used can be read in normal orientation.

DETAILED DESCRIPTION

Figure 1:
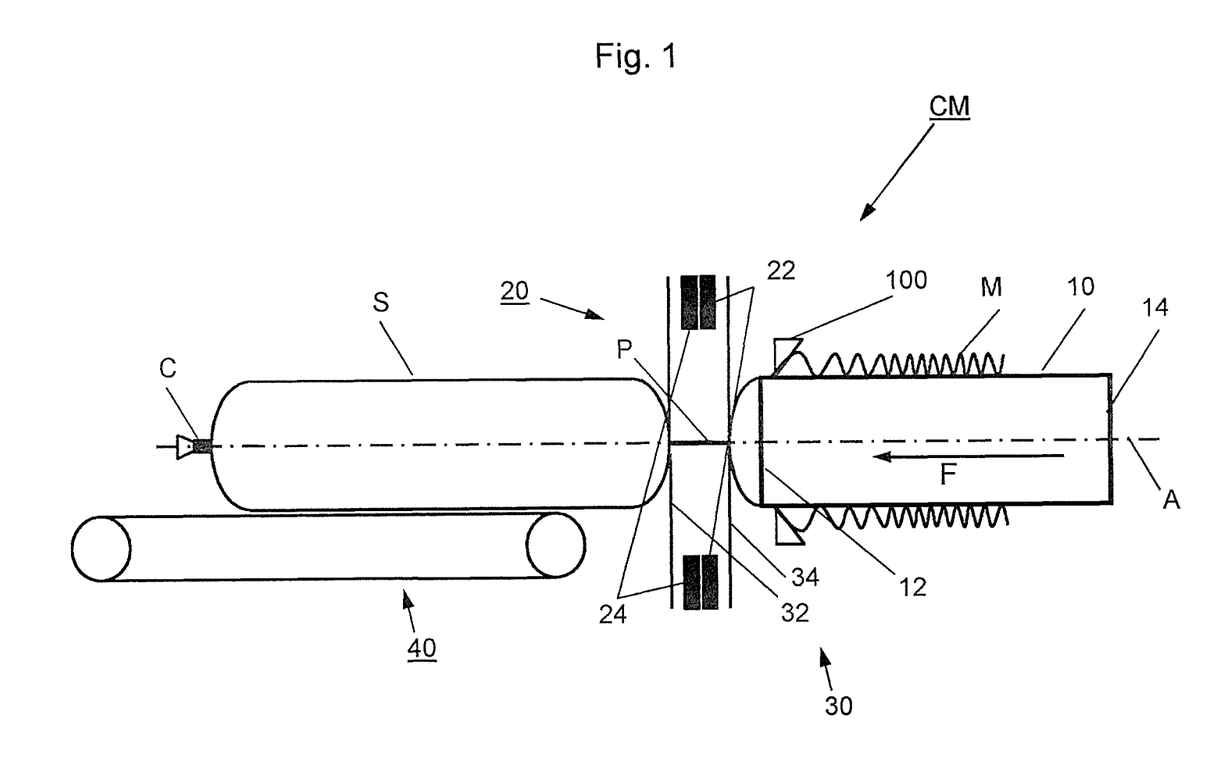
FIG. 1: is a schematic view to a clipping machine including a casing brake assembly according to the present invention.

A production apparatus or clipping machine CM for producing sausage-shaped products S shown in FIG. 1, comprises, as main components, a circular cylindrical filling tube 10 having a longitudinally extending central axis A and being made of a suitable material, like stainless steel. A tubular packaging casing M made of a thin sheet material is stored on the filling tube 10. Clipping machine CM further includes a clipping device 20 and gathering means 30 for gathering the filled tubular packaging casing M and for forming a plait-like portion P thereto which are arranged downstream filling tube 10. The plait-like portion P is at least approximately free of filling material. Clipping device 20 is provided for closing the filled tubular packaging casing M by applying a closure means, like a closure clip C, to said plait-like portion P.

As further can be inferred from FIG. 1, horizontally arranged filling tube 10 has a left end 12 facing clipping device 20 and a right end 14 coupled to a filler arrangement (not shown in FIG. 1) including a pump for feeding filling material through filling tube 10 in a feeding direction F into tubular packaging casing M closed on its end facing in the filling direction F by a closure clip C.

Positioned immediately downstream left end 12 of filling tube 10, clipping device 20 is arranged and coaxially aligned to filling tube 10. Clipping device 20 comprises a first and a second pair of clipping tools 22, 24, wherein each pair of clipping tools 22, 24 includes a punch and a die. Gathering means 30 include a first displacer unit 32 and a second displacer unit 34, wherein first displacer unit 32 is positioned downstream second displacer unit 34. First and second pair of clipping tools 22, 24 of clipping device 20 are positioned between first and second displacer units 32, 34 for applying one or two closure clips C to plait-like portion P.

Furthermore, for discharging sausage-shaped product S just produced in clipping machine CM, downstream clipping device 20, a transportation device or belt conveyor 40 is arranged, comprising a conveyor belt and guide rollers. The transportation direction of belt conveyor 40 coincides with feeding direction F. The height of the upper conveyor belt section of belt conveyor 40 is aligned to the lower side of the sausage shaped product S to be produced and discharged from clipping machine CM.

Clipping machine CM further comprises an inventive casing brake assembly 100, which may be arranged on filling tube 10 in the vicinity of left end 12 of the filling tube 10 in order to control the movement or pull-off speed of tubular packaging casing M when pulled-off from filling tube 10 resulting from the filling pressure of the filling material, by applying a frictional force to tubular packaging casing M. In FIG. 1, for clarity reasons, only one ring-shaped brake element of casing brake assembly 100 is shown. The casing brake assembly 100 according to the present invention will be described in greater detail in the following.

Figure 2:
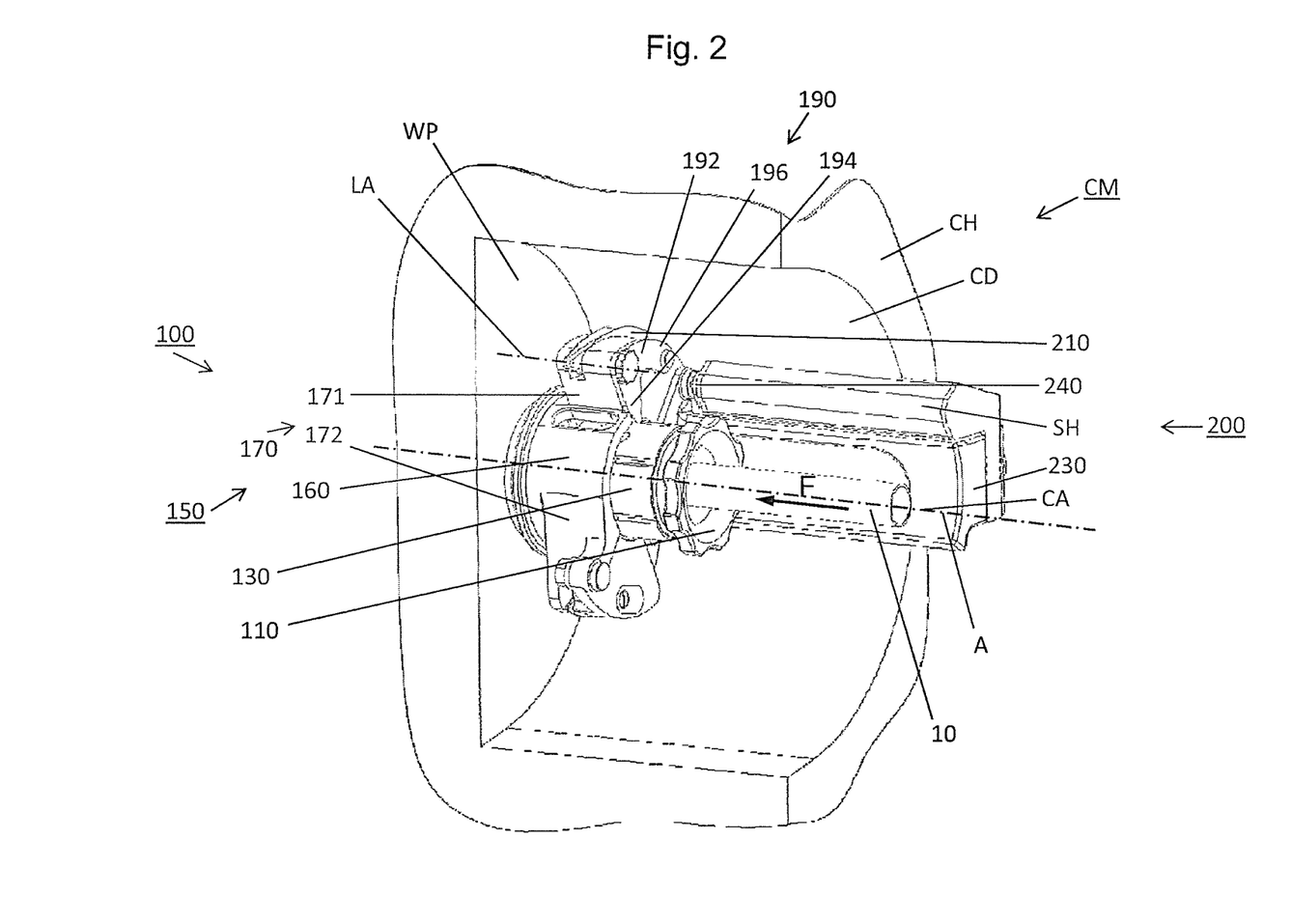
FIG. 2: is a cut-out of a schematic and perspective view to an inventive clipping machine including a casing brake assembly according to the present invention.

FIG. 2 is a cut-out of a schematic and perspective view to clipping machine CM according to the present invention. In particular, FIG. 2 shows a front portion of clipping machine CM, which partially surrounds left end or front end 12 of filling tube 10, with casing brake assembly 100 positioned thereon. Casing brake assembly 100, in FIG. 2, is arranged in its operating position.

Clipping machine CM includes a housing CH with an approximately semi-cylindrical depression CD terminating in an approximately semicircular wall portion WP which separates gathering means 30 arrange behind wall portion WP, from casing brake assembly 100. Semicircular wall portion WP has a circular opening WO (see FIG. 7), through which filled tubular packaging casing M is guided towards gathering means 30 and clipping device 20.

Figure 6:
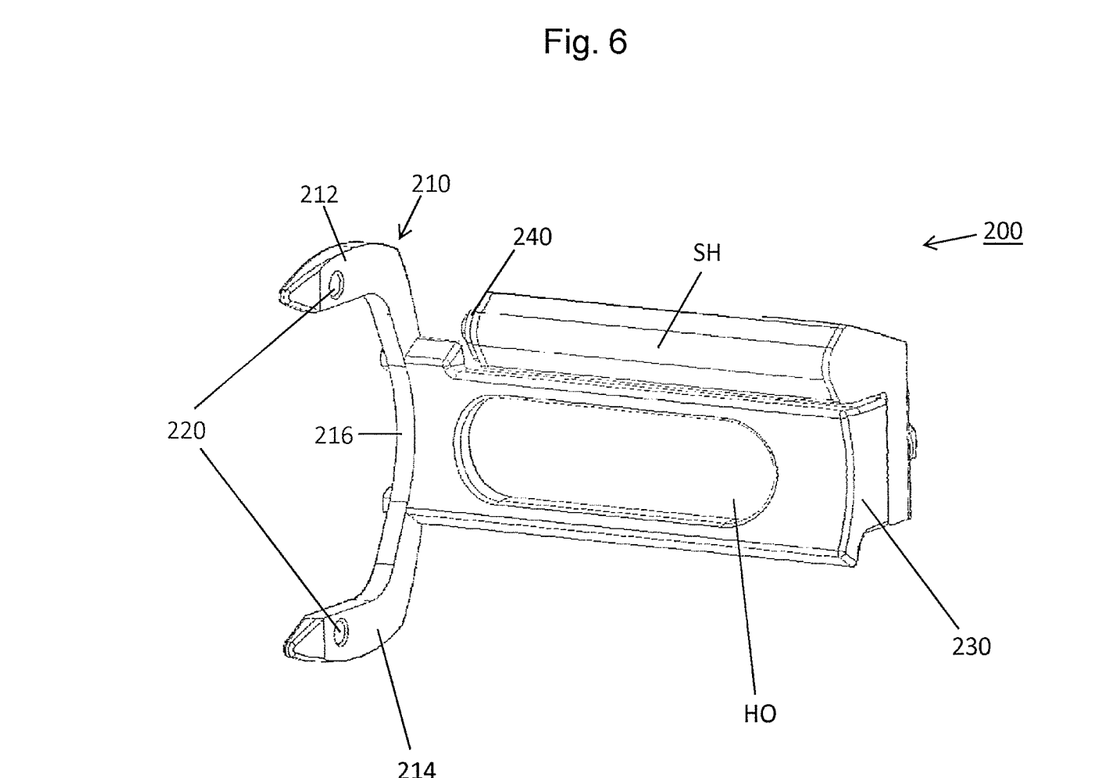
FIG. 6: is a schematic and perspective view to a mounting device according to the present invention.

Clipping machine CM further comprises a mounting device 200 to which casing brake assembly 100 may be mounted (see also FIG. 6). Mounting device 200 includes a mounting element 210 which engages casing brake assembly 100, and a base portion 230 which is attached to clipping machine CM, particularly to a portion of the frame work or housing CH.

Casing brake assembly 100 comprises an at least approximately tubular support means 110 for supporting at least one approximately ring-shaped brake element, an at least approximately tubular bushing 130 for accommodating tubular support means 110 and the ring-shaped brake element, and an attachment device 150 including an at least approximately tubular accommodation portion 160 for accommodating tubular bushing 130, and at least one attachment portion 170 for attaching casing brake assembly 100 on clipping machine CM. As can be seen in FIG. 2, attachment portion 170 includes two identical lugs 171, 172.

Tubular support means 110, tubular bushing 130 and attachment device 150 of casing brake assembly 100 each have a central axis (not shown) which, when assembled, coincide and thereby form a common central axis CA of casing brake assembly 100. Central axis CA of casing brake assembly 100 also coincides with central axis A of filling tube 10, when mounted to clipping machine CM.

Furthermore, mounting device 200 includes a sensor device 240 arranged in the upper region on the left side of base portion 230, facing towards mounting element 210. Sensor device 240 is covered by a sensor housing SH. Sensor device 240 may detect casing brake assembly 100 when mounted to clipping machine CM.

Figure 3:
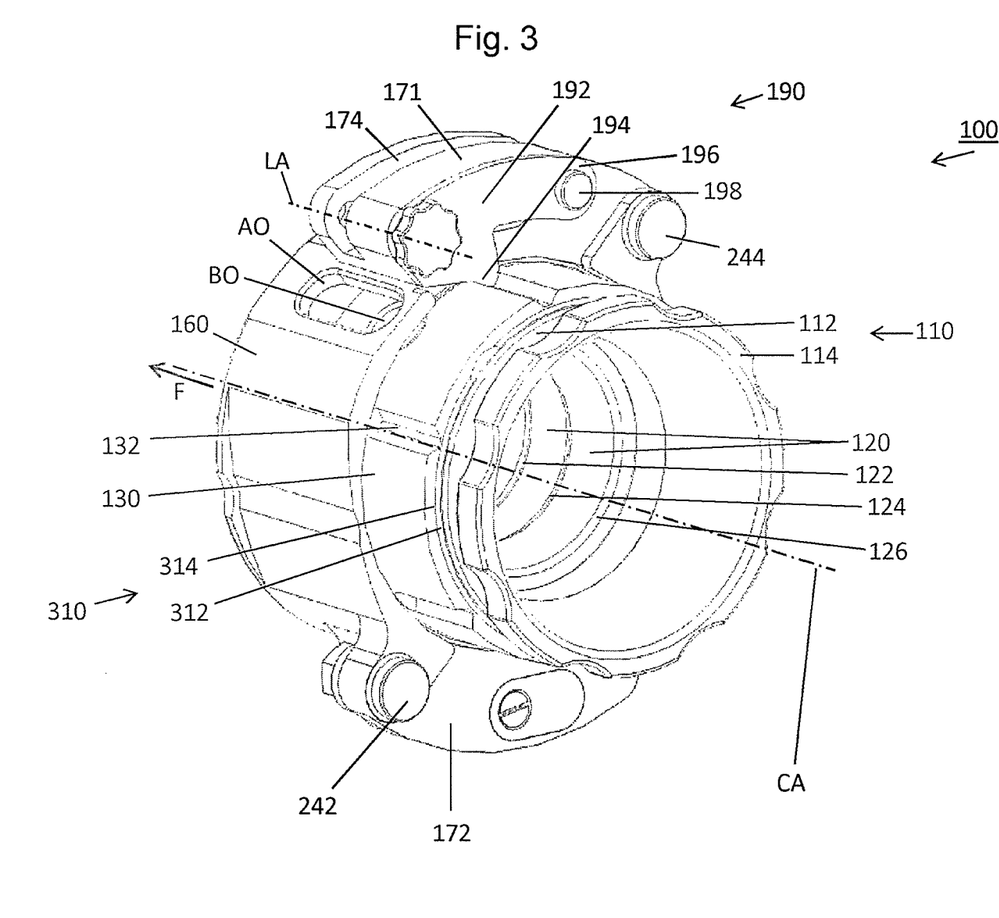
FIG. 3: is a schematic and perspective view to a casing brake assembly according to the present invention.

Sensor device 240 according to the embodiment of FIGS. 2 and 3 comprises a first sensor element 242, like a magnetic or metal sensitive element, arranged on base portion 230 of mounting device 200, and a second sensor element 244, like a magnetic or metal element detectable by first sensor element 242, arranged on an outer surface of each of lugs 171, 172 facing towards first sensor element 242. Second sensor elements 244, one on each of lugs 171, 172, which are arranged in an angle of 180° to each other about central axis CS of casing brake assembly 100, and such that one of second sensor elements 244 is positioned in closed vicinity to first sensor element 242 of sensor device 240 to be detected by first sensor element 242, when casing brake assembly 100 is positioned in mounting element 210 of mounting device 200 of clipping machine CM.

The specific arrangement of lugs 171, 172 and second sensor elements 244 on lugs 171, 172 enable to position casing brake assembly 100 in two possible operating positions in mounting element 210, in a first operating position as shown in FIGS. 2 and 3, and in a second operating position, in which casing brake assembly 100 is rotated about 180° about its central axis CA.

Alternatively, sensor device 240 may be carried out as a single sensor, like a light sensitive device, which only requires a suitable counter surface.

Sensor device 240 may also detect specific features of a casing brake assembly 100 attached to clipping machine CM. Said specific features may identify casing brake assembly 100 with regard to its usability for the production of different kinds of products, like its size and/or the kind of the brake elements. Naturally, by detecting said specific features, also information regarding the presence or absence, or the correct position of casing brake assembly may be captured.

FIG. 3 is a schematic and perspective view to casing brake assembly 100 according to the present invention.

As can be inferred from FIG. 3, tubular support means 110 of casing brake assembly 100 has an approximately cylindrical support portion 112 with a handle 114 at its upstream end, i.e. that end extending from casing brake assembly 100 in a direction contrary to filling direction F. Handle 114 is formed by a circumferentially extending rim having depressions arranged in regular intervals in its circumferential surface, for facilitating the manual manipulation of support means 110. Cylindrical support portion 112 has a cylindrical outer surface, whereas its inner surface is conically shaped tapering in feeding direction F (see also FIG. 4).

Support means 110 supports two approximately ring-shaped brake elements 120 arranged coaxially with support means 110 and downstream therefrom inside tubular bushing 130. Adjusting rings 122, 124, 126 separate ring-shaped brake elements or brake rings 120 from support means 110 and from each other, as will be explained in detail in conjunction with FIG. 4 below. Adjusting rings 122, 124, 126 enable an adjustment of the frictional force applied by brake rings 120 to tubular packaging casing M when pulled off from filling tube 10.

Tubular bushing 130 is cylindrically shaped with approximately V-shaped grooves 132 extending in feeding direction F on the outer surface of tubular bushing 130. Grooves 132 are arranged in regular intervals on outer surface of tubular bushing 130, which form a part of a ratchet mechanism for securing tubular bushing 130 in its selected position relative to attachment device 150.

As can be seen in FIG. 2, at lug 171 of attachment portion 170 of attachment device 150, a securing device 190, which is also part of the ratchet mechanism, is arranged for securing tubular bushing 130 in its selected position relative to attachment device 150.

Securing device 190 includes an angled lever 192 having a pivot axis LA extending through attachment portion 171, being arranged in the inflection region of angled lever 192, and being aligned approximately parallel to central axis CA of casing brake assembly 100. Angled lever 192 further has an engagement end 194 at one of the lever portions of angled lever 192, which is directed approximately radially towards central axis CA of casing brake assembly 100. The respective other lever portion extends approximately tangentially from pivot axis LA of lever 192, and having a free 196 end for manually manipulating lever 192. Lever 192 may be spring-loaded for being urged clockwise about its pivot axis LA into its locking position when seen in filling direction F.

It has to be understood that tubular bushing 130 may rotated by hand against the force of spring-biased lever 192, without manually manipulating lever 192.

The cross sectional shape of grooves 132 corresponds to the shape of engagement end 194 of lever 192 of securing device 190. Moreover, on free end 196 of lever 192, an actuation element 198 is arranged for manually pivoting lever 192 about lever pivot axis LA. Engagement end 194 of lever 192, as the ratchet element, and groove 132 as the counter-ratchet element, being engaged by engagement end 194, form the ratchet mechanism.

Actuation element 198 is a projection extending from lever 192 in a direction contrary to feeding direction F. In a further embodiment, actuation element 198 may be spring-loaded for securing lever 192 in its position shown in FIG. 3 against unintentional movement.

Furthermore, a first adjustment means 310 is provided at tubular support means 110 and tubular bushing 130, for adjusting at least the axial position of support means 110 relative to tubular bushing 130. First adjustment means 310, according to the embodiment of FIG. 3, includes an external thread 312 arranged on the outer surface of cylindrical support portion 112 of support means 110 and a corresponding internal thread 314 on inner surface of tubular bushing 130. By means of first adjustment means 310, cylindrical support portion 112 of support means 110 may reversibly be screwed into tubular bushing 130. Thereby, brake rings 120 may be deformed such that a defined frictional force to be applied to tubular packaging casing M may be adjusted. In particular, by deforming brake rings 120, their internal diameter may be varied, namely, when compressing brake rings 120, due to the specific design of brake rings 120 and adjusting rings 122, 124, 126 (see FIG. 4), their internal diameter may be reduced, whereas when releasing brake rings 120, their internal diameter may be enlarged.

Moreover, a second adjustment means 320 is provided at tubular bushing 130 and attachment device 150, for adjusting the axial position of tubular bushing 130 relative to attachment device 150. Second adjustment means 180 includes an external thread 322 on the outer surface of tubular bushing 130 and a corresponding internal thread 324 on inner surface of accommodation portion 160 of attachment device 150 (see FIG. 4). By means of second adjustment means 320, tubular bushing 130 may reversibly be screwed into accommodation portion 160 of attachment device 150. Due to the fact that attachment device 150 is mounted in a fixed position relative to clipping machine CM, second adjustment means 320 allow to adjust the position of brake rings 120 on filling tube 10, i.e. their distance to front end 12 of filling tube 10.

In the embodiment of casing brake assembly 100 shown in FIGS. 2 and 3, an approximately circular opening BO is provided in tubular bushing 130, and an elongated opening AO is provided in accommodation portion 160 of attachment device 150. Openings AO, BO and grooves 132 in tubular bushing 130 are arranged in a manner that tubular bushing 130 may be positioned in accommodation portion 160 such that opening BO in tubular bushing 130 is radially aligned with opening AO in accommodation portion 160. Thereby, in the shown embodiment of casing brake assembly 100, a visual control of tubular packaging casing M on filling tube 10 is possible.

Figure 4:
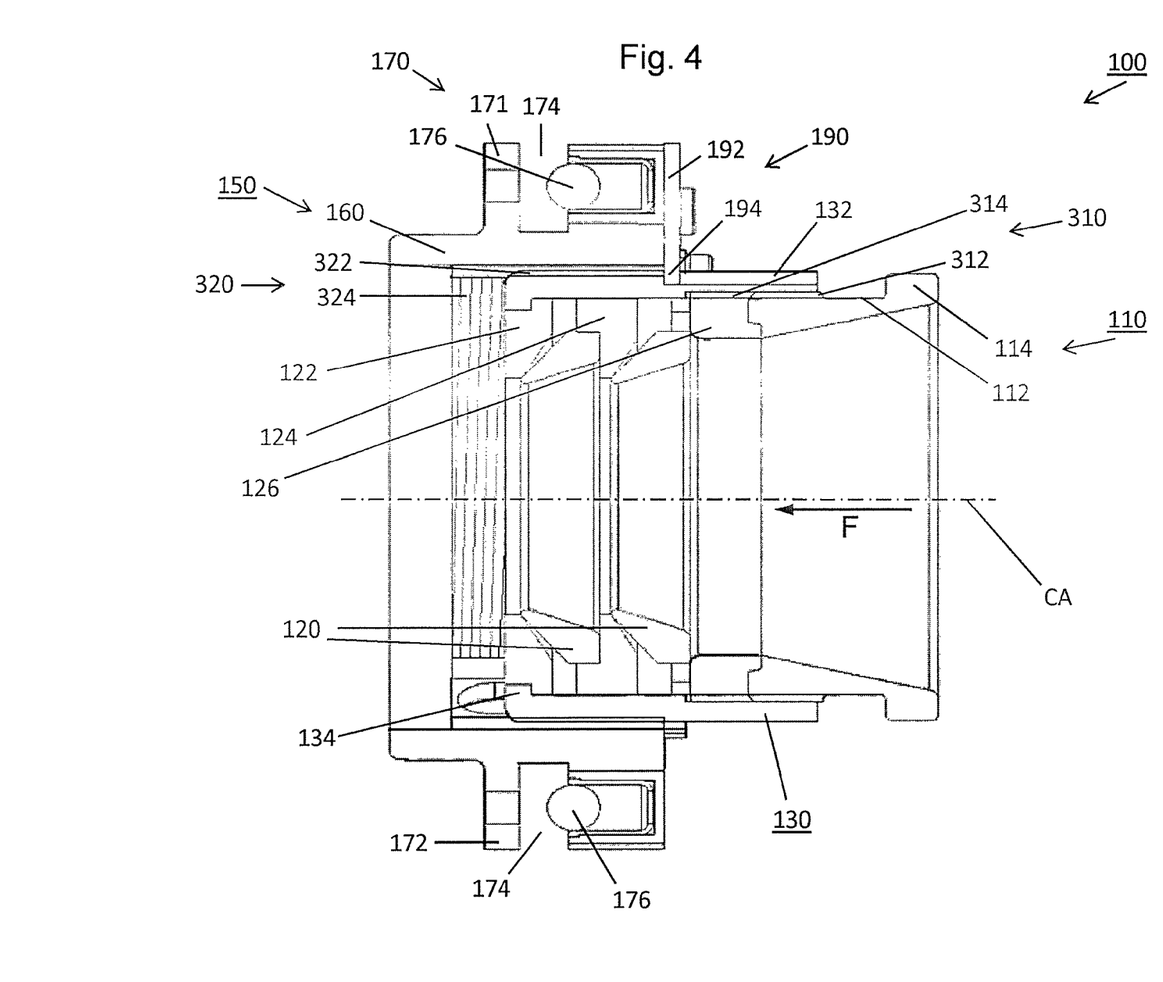
FIG. 4: is a longitudinal section of the casing brake assembly of FIG. 3 in a vertical plane extending through the central axis of the casing brake assembly.

FIG. 4 is a longitudinal section of casing brake assembly 100 of FIG. 3 in a vertical plane extending through central axis CA of the casing brake assembly 100.

Casing brake assembly 100 includes attachment device 150 for attaching casing brake assembly 100 to clipping machine CM. Attachment device 150 comprises approximately cylindrical accommodation portion 160 and attachment portion 170. Attachment portion 170 comprises identically shaped lugs 171, 172, in each of which a portion of circumferentially extending groove 174 is arranged.

As further can be seen in FIG. 4, in each of lugs 171, 172, a sphere 176 is arranged in a blind hole 177 the opening of which is directed towards groove 174. Spheres 176 are spring-biased such that they partially extend into groove 174, and reversibly movable against the force of the springs (not shown) into blind holes 177. Spheres 176, when casing brake assembly 100 is mounted to clipping machine CM, may engage respective approximately semi-spherically shaped depressions 220 in the side surfaces of the arms of U-shaped mounting element 210 (see FIG. 6).

Said depressions 220 in mounting element 210, together with spring loaded spheres 176 form a position defining device by means of which casing brake assembly 100 may be arrange in a defined position in mounting element 210.

Tubular bushing or bushing 130 is positioned with its left end portion inside the right end portion of accommodation portion 160 of attachment device 150. Bushing 130 comprises external thread 322 engaging internal thread 324, which together form second adjustment means 320.

V-shaped grooves 132, from which one is visible at the upper edge of bushing 130, extend in feeding direction F on the outer surface of bushing 130 from the right edge towards the center of bushing 130. In FIG. 4, engagement end 194 of lever 192 engages groove 132 in the region of its left end. The length of groove 132 and the length of threads 322, 324 of second adjustment device 320 thereby define the overall depth bushing 130 being insertable into accommodation portion 160 of attachment device 150.

Bushing 130 is provided with a rim 134 extending circumferentially from the left end of bushing 130 and towards central axis CA of casing brake assembly 100. Rim 134 of bushing 130 acts as an abutment element and an axial support in feeding direction F for adjusting rings 122, 124, 126 arranged inside bushing 130. The left end of cylindrical support portion 112 acts as the counter abutment element and axial support for adjusting rings 122, 124, 126 in the counter direction. At the right end of bushing 130, and at its inner surface, internal thread 314 is provided, which is engaged by external thread 314 arranged on the outer surface at the left end of cylindrical support portion 112 of support means 110. Internal thread 312 of bushing 130 and external thread 314 of support portion 112 together form the first adjustment means 310 for adjusting at least the axial position of support means 110 relative to tubular bushing 130.

Handle 114 has the shape of a rim circumferentially extending from the right end of support means 110 and radially outwardly therefrom. The right side surface of handle 114 defines the right end of support portion 112. The left side surface of handle 114 may act as an abutment element for limiting the screw-in depth of support portion 112 into bushing 130.

Adjusting rings 122, 124, 126 are arranged in bushing 130, with one ring-shaped brake element or brake ring 120 between adjusting rings 122, 124, and a second ring-shaped brake element or brake ring 120 between adjusting rings 124, 126. The outer diameters of adjusting rings 122, 124, 126 correspond to the inner diameter of bushing 130.

Adjusting ring 122 has a circumferentially extending cut-out of rectangular cross section, arranged at its left side and on its outer surface, which corresponds to and is engaged by rim 134 of bushing 130. Rim 134 thereby axially supports adjusting ring 134. On its ride side surface, adjusting ring 122 has a conical portion tapering in feeding direction F, against which approximately conically shaped brake ring 120, the left brake ring 120 according to FIG. 4 may be pushed for being deformed.

Adjusting ring 124 has a circumferential cut-out of rectangular cross section at its left side arranged at its inner surface, which corresponds to the outer diameter of brake ring 120 which is accommodated with its right end in said cut-out. On its right side, adjusting ring 124 has a conical portion tapering in feeding direction F, against which approximately conically shaped brake ring 120, the right ring 120 in FIG. 4, may be pushed for being deformed.

Adjusting ring 126 has a circumferentially cut-out of rectangular cross section at its left side arranged at its inner surface, which corresponds to the outer diameter of right brake ring 120 which is accommodated with its right end in said cut-out. On the right side of adjusting ring 126, a circumferentially arranged cut-out is provided facing towards support portion 112, which corresponds to a circumferential rim on support portion 112 facing towards adjusting ring 126 and being in form-fit engagement with circumferential cutout of adjustment ring 126.

The inner diameter of adjusting rings 122, 124, 126 is larger than the outer diameter of filling tube 10, whereas the inner diameter of brake rings 120 is approximately equal to the outer diameter of filling tube 10. While being deformed by screwing support portion 112 into bushing 130, the inner diameter of brake rings may be reduced during deforming brake rings 120. Thereby, the frictional force applied to tubular packaging casing being pulled off from filling tube 10, may be increased.

In an alternative embodiment, brake rings 120 are inflatable and deflatable by applying or removing a pressurized fluid thereto, for adjusting the frictional force to be applied to tubular packaging casing M. In this case, openings AO, BO may be used for guiding fluid supplying elements, like hydraulic or pneumatic tubes and connectors, to the adjustable brake rings (see FIG. 3). Further in this case, adjusting rings 122, 124, 126 may be provided with a more simple design, just for securing the inflatable brake rings 120 in their axial position.

Figure 5:
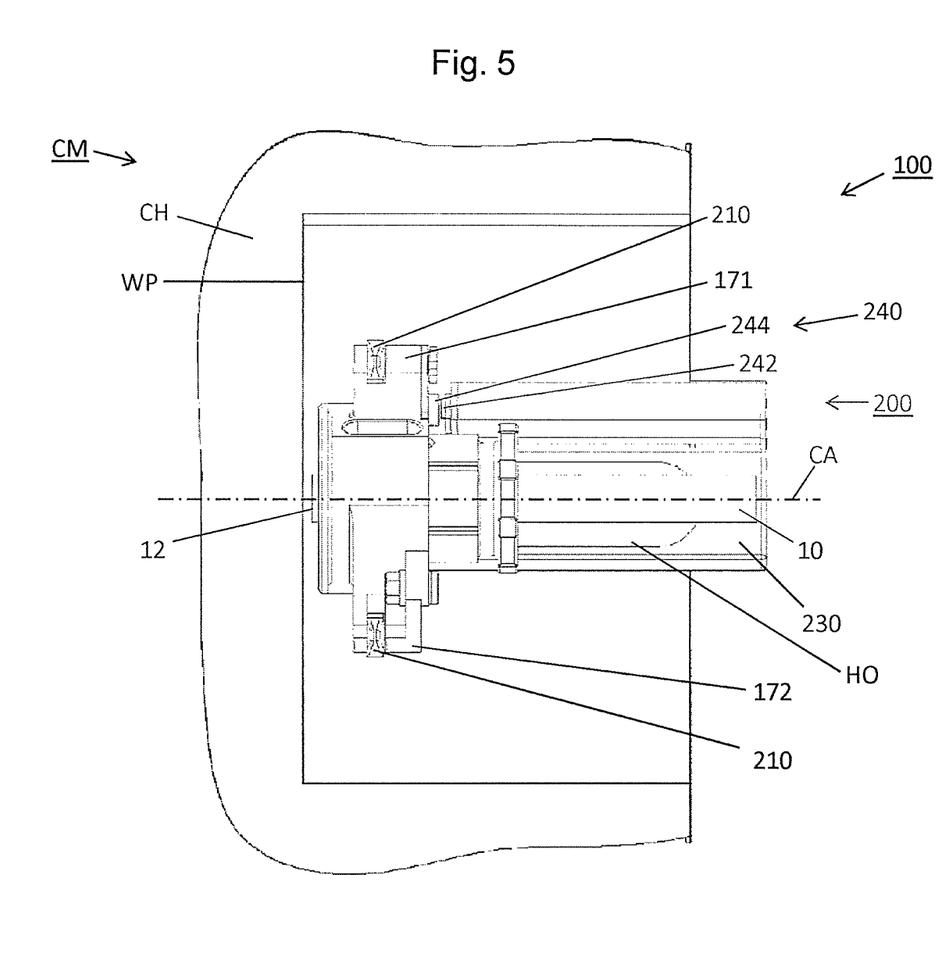
FIG. 5: s a schematic view to the front side of the cut-out according to FIG. 2.

FIG. 5 is a schematic view to the front side of the cut-out of clipping machine CM according to FIG. 2.

Casing brake assembly 100 is mounted to clipping machine CM in its operating position, i.e. casing brake assembly 100 is arranged on filling tube 10 and attached to mounting device 200. In particular, in the operating position, mounting element 210 of mounting device 200 engages attachment portion 170 of attachment device 150.

As can be seen in FIG. 2, attachment portion 170 of attachment device 150 includes two identical lugs 171, 172. Lugs 171, 172 are arranged on the outer surface of approximately cylindrical accommodation portion 160, and opposite to each other, i.e. in an angle of 180° about central axis CA of casing brake assembly 100. In each of lugs 171, 172, a groove 174 is arranged, which extends in circumferential direction. The dimension of groove 174, in particular its width and depth, correspond to the width of approximately U-shaped mounting element 210 of mounting device 200, and the clearance between the arms of mounting element 210 (see also FIGS. 6, 7).

In the operating position of casing brake assembly 100, second sensor element 244 arranged on lug 171 of attachment portion 170 is positioned in closed vicinity to first sensor element 242 of sensor device 240, attached to base portion 230 of mounting device 200.

On the left side of casing brake assembly 100, left end or front end 12 of filling tube 10 is visible, slightly extending from the left side of attachment device 150 of casing brake assembly 100.

As explained above, mounting element 210 of mounting device 200 is mounted to clipping machine CM in a fixed position relative to semicircular wall portion WP of clipping machine housing CH. Thereby, the gap between the left end of casing brake assembly 100, in particular attachment device 150, and semicircular wall portion WP is invariant at least during the production of sausage-shaped products S. Thereby a gap of defined width may be selected or adjusted, as explained below, which prevents an operator from unintentional reaching through opening WO into moving parts of clipping machine CM, like gathering means 30 or clipping device 20 positioned immediately behind wall portion WP of clipping machine housing CH.

Said gap depends on the position of mounting device 200 relative to wall portion WP and the position of groove 171 relative to the left end of attachment device 150. In order to enable an adjustment of the width of the gap, a casing brake assembly 100 may be selected according to position of groove 171 relative to the left end of attachment device 150, or the axial position of mounting device 200 may be varied, or a combination of both may be chosen. For enabling varying the axial position of mounting device 200 relative to housing CH, means for reversibly shifting mounting device 200 parallel to central axis A of filling tube 10 or central axis CA of casing brake assembly 100 in the operating position, have to be provided, like elongated holes arranged parallel to central axes A, CA in base portion 230 of mounting device 200 or in semi-cylindrical depression CD of housing CH.

Figure 7:
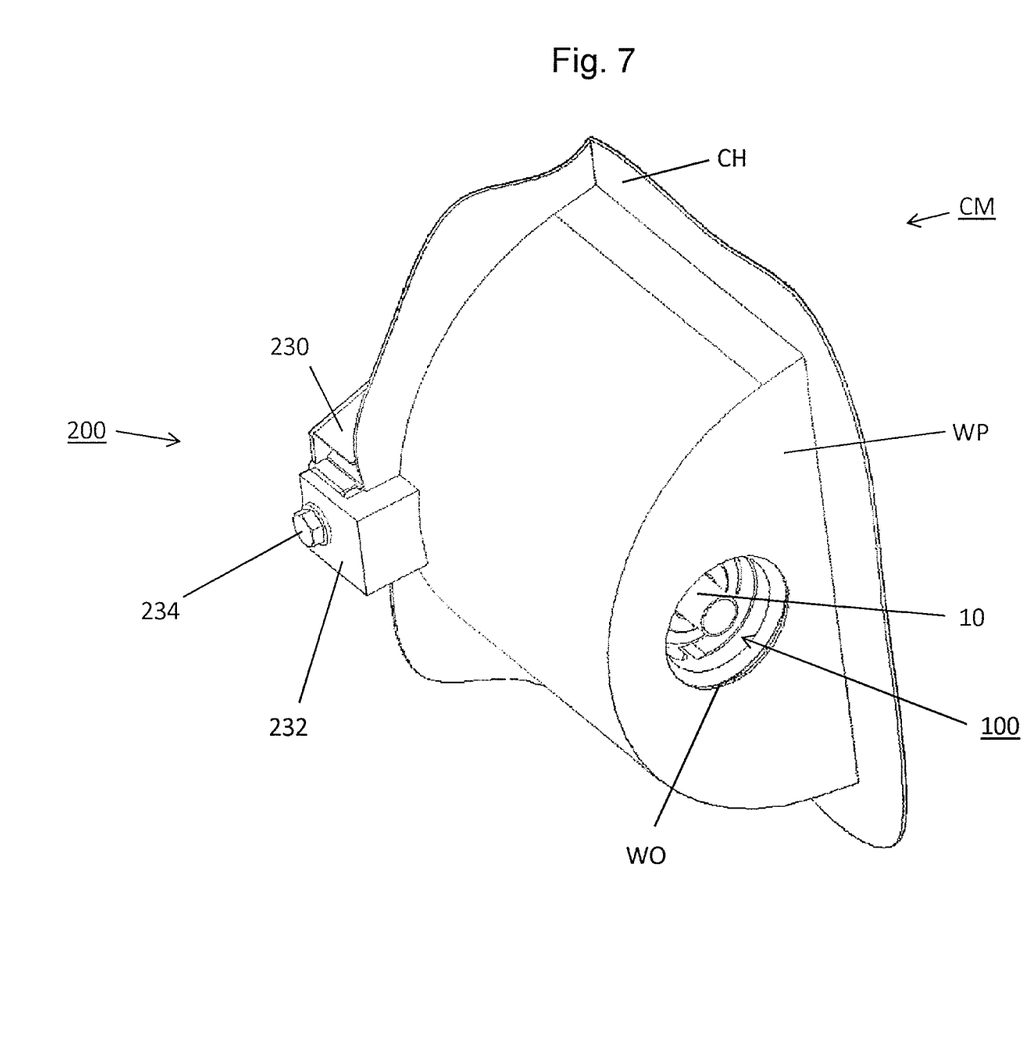
FIG. 7: is a schematic and perspective view to the rear side of the cut-out according to FIG. 2.

Semicircular wall portion WP has a circular opening WO positioned immediately in front of front end 12 of filling tube 10, through which filled tubular packaging casing M is guided towards gathering means 30 and clipping device 20 (see FIG. 7).

In its operating position, casing brake assembly 100 covers said opening WO in wall portion WP, the diameter of which may be smaller than the outer diameter of accommodation portion 160 of attachment device 150. Thus, casing brake assembly 100 forms a safety device which may prevent an unintentional engagement of the movable elements behind wall portion WP, like gathering means 30 or clipping device 20, by an operator.

FIG. 6 is a schematic and perspective view to mounting device 200 according to the present invention.

Mounting device 200 has bar-shaped base portion 230 which may be mounted to housing CH of clipping machine CM. On its left end according to FIG. 6, approximately U-shaped mounting element 210 is attached by respective screws.

U-shaped mounting element 210 is of approximately rectangular cross section with two side surfaces arranged parallel to each other. Mounting element 210 has two arms 212, 214 which extend approximately parallel to each other in approximately horizontal direction and approximately vertically to central axis CA of casing brake assembly 100 or central axis A of filling tube 10 (see FIG. 5). Arms 212, 214 extend from the ends of an approximately vertically arranged base 216 being slightly curved towards arms 212, 214.

The free ends of arms 212, 214 terminate in tip ends. In the region of the free ends of arms 212, 214, in vicinity to the tapering end portions, semi-spherical depressions 220 are provided, into which spheres 176 of the position defining device may engage when positioning casing brake assembly in mounting device 200.

It has to be understood that mounting element 210 may be provided with blind holes or through holes of respective diameter, into which spheres 176 may engage when positioning casing brake assembly in mounting device 200.

Sensor device 240 is attached to base portion 230 of mounting device 200. Sensor device 240 is accommodated in sensor housing SH arranged along the upper surface of base portion 230 of mounting device 200, for preventing sensor device 240 from being damaged or contaminated. Sensor device 240 faces towards mounting element 210 with its sensing element, for detecting casing brake assembly 100, or a portion thereof, when positioned therein.

Base portion 230 of mounting device 200 is further provided with an elongated hole or opening HO for guiding fluid supplying elements, like hydraulic or pneumatic tubes, via openings AO, BO in accommodation portion 160 and bushing 130, to the adjustable brake rings.

FIG. 7 is a schematic and perspective view to the rear side of the cut-out of clipping machine CM according to FIG. 2 or 5.

As can be seen in FIG. 7, casing brake assembly 100 completely covers opening WO in semi-circular wall portion WP of clipping machine housing CH. Thereby en unintentional engagement through said opening into the moving parts of clipping machine CM, like clipping device 20 or gathering means 30, by an operator may be prevented. Casing brake assembly 100 thereby securely functions as a safety device.

In the embodiment of clipping machine CM according to FIG. 9, mounting device 200 and in particular base portion 230 of mounting device 200, comprises a fixing unit or a clamping device, which in the specific configuration has the form of a bracket 232 secured to base portion 230 by a screw 234.

Base portion 230 is mounted to clipping machine housing CH by means of said clamping device or bracket 232, which enables the attachment of an inventive casing brake assembly 100 to existing clipping machines as an upgrade part. By upgrading an existing clipping machine, only sensor device 240 has to be coupled to the control unit of said existing clipping machine.

It has to be understood that bracket 232, as a clamping device, is only one possible example of a fixing unit. Other mounting means may be provided, which not literally needs to "clamp" mounting device 200 to the clipping machine. Any suitable fixing means may be used for fixing mounting unit 200 to clipping machine CM. Also, adapter elements may be used for adapting the position of mounting device 200 relative to the filling tube and the frame work of the clipping machine, namely the opening in the housing, which has to be covered by casing brake assembly 100.

In the production of sausage-shaped products S, particularly during refilling tubular packaging casing material M to filling tube 10, or during changing the kind of products to be produced, i.e. the kind of filling material and/or the kind of tubular packaging casing, clipping machine CM is stopped. Filling tube 10 together with casing brake assembly 100 is pivoted about its end facing away from clipping machine CM. Thereby, casing brake assembly 100 is removed from mounting element 210 of mounting device 200. Thereafter, casing brake assembly 100 is shifted from filling tube 10.

When removing casing brake assembly from clipping machine CM, second sensor element 244 is moved away from first sensor element 242 of sensor device 240, and may thus, not being detected. As signal is put out by sensor device 240 to the control unit of clipping machine CM, which provides the operator with the information that casing brake assembly 100 is not in its operating position, and which prevents clipping machine from being started.

After tubular packaging casing M has been refilled on filling tube 10, casing brake assembly 100 is shifted onto front end 12 of filling tube 10. Filling tube 10 together with casing brake assembly 100 is pivoted back towards clipping machine CM, and casing brake assembly 100 is mounted to clipping machine CM by inserting arms 212, 214 of mounting element 210 into groove 174 in lugs 171, 172 of attachment device 150, until spheres 176 in lugs 171, 172 entering depressions 220 in arms 212, 214 of mounting element 210.

Second sensor element 244 is thereby be replaced closed to first sensor element 242 of sensor device 240 and may be detected accordingly. A respective signal is sent to the control unit of clipping machine CM, which enables to start clipping machine CM, and which informs the operator that casing brake assembly is correctly positioned in its operating position in clipping machine CM.

Thereafter, for adapting the position of brake elements 120 on filling tube 10, e.g. dependent on the kind of products to be produced, lever 192 is pivoted counterclockwise about pivot axis LA, whereby engagement end 194 of lever 192 disengages groove 132 of bushing 130. Bushing 130 may than be rotated relative to accommodation portion 160 of attachment device 150, for shifting brake rings 120 along filling tube 10. When brake rings 120 are correctly positioned, lever 192 may be released to enable engagement end 192 to engage a respective groove 132 in bushing 130, for securing the selected position of brake rings 120.

If necessary, the frictional force to be applied to tubular packaging casing when being pulled off from filling tube 10 may be adjusted by rotating support portion 112 of support means 110 about central axis CA of casing brake assembly 100, for deforming brake rings 120 about a defined degree.

What is claimed is:

1. A casing brake assembly for applying a frictional force to a tubular or bag-shaped packaging casing being arranged on a filling tube of a production apparatus which is used in the production of sausage-shaped products and for limiting the movement of said tubular or bag-shaped packaging casing at least while being filled, the casing brake assembly comprises:
    tubular support means for supporting at least one brake element having an at least approximately ring-shaped design, and
    wherein a tubular bushing for accommodating the tubular support means together with the at least one brake element, and
    an attachment device including an at least approximately tubular accommodation portion for accommodating the tubular bushing, and at least one attachment portion configured for attaching the casing brake assembly to the production apparatus,
    wherein first and second adjustment means are provided,
    wherein a second adjustment means is provided on the at least approximately tubular bushing and the attachment device, for adjusting at least the axial position of the tubular bushing relative to the attachment device.

2. The casing brake assembly according to claim 1, wherein a first adjustment means is provided at the at least approximately tubular support means and the at least approximately tubular bushing, for adjusting at least the axial position of the support means relative to the tubular bushing.

3. The casing brake assembly according to claim 2, wherein the first adjustment means include a guide element provided on the outer surface of the support means, and a counter-guide element provided on the inner surface of the tubular bushing.

4. The casing brake assembly according to claim 1, wherein the first adjustment means include an external thread provided on the outer surface of the support means, and an internal thread provided on the inner surface of the tubular bushing.

5. The casing brake assembly according to claim 4, wherein the second adjustment means include a guide element provided on the outer surface of the tubular bushing, and a counter-guide element provided on the inner surface of the at least approximately tubular accommodation portion of the attachment device.

6. The casing brake assembly according to claim 3, wherein the second adjustment means include an external thread provided on the outer surface of the tubular bushing, and an internal thread provided on the inner surface of the at least approximately tubular accommodation portion of the attachment device.

7. The casing brake assembly according to claim 1, wherein the attachment device further comprises a securing device for securing the tubular bushing in its position relative to the attachment device.

8. The casing brake assembly according to claim 7, wherein the securing device includes an approximately hook-shaped ratchet element which engages at least one counter-ratchet element arranged on the outer surface of the tubular bushing.

9. The casing brake assembly according to claim 1, wherein the attachment device further includes a position defining device.

10. The casing brake assembly according to claim 1, wherein the attachment device is adapted to be arranged on the production apparatus in a fixed position relative to the production apparatus, or at least a portion of the housing thereof.

11. An apparatus for producing sausage-shaped products by filling tubular or bag-shaped packaging casings with filling material and closing said filled tubular or bag-shaped packaging casing, including a filling tube through which filling material is fed into a tubular or bag-shaped packaging casing which is stored on said filling tube, gathering means for gathering said filled tubular packaging casing and for forming a plait-like portion thereto, and a clipping device for applying at least one closure means to the plait-like portion formed on the filled tubular or bag-shaped packaging casing, the apparatus further comprises:
    a mounting device for reversibly mounting a casing brake assembly thereto, a casing brake assembly according to claim 1.

12. The apparatus according to claim 11, wherein the mounting device includes a mounting element which is adapted to reversely engage the attachment portion of the casing brake assembly.

13. The apparatus according to claim 1, wherein a sensor means is provided for detecting the casing brake assembly when positioned in the mounting device.

14. A mounting device for being attached to an apparatus for producing sausage-shaped products, like sausages, for mounting a casing brake assembly according to claim 1 thereto, the mounting device comprises a fixing unit.

* * * * *